United States Patent
Fu et al.

(10) Patent No.: US 12,246,456 B2
(45) Date of Patent: Mar. 11, 2025

(54) IMAGE GENERATION DEVICE, ROBOT TRAINING SYSTEM, IMAGE GENERATION METHOD, AND NON-TRANSITORY COMPUTER READABLE STORAGE MEDIUM

(71) Applicant: OMRON Corporation, Kyoto (JP)

(72) Inventors: Kin Chung Denny Fu, Kyoto (JP); Yuki Yamaguchi, Nara (JP); Yohei Okawa, Koshigaya (JP); Kennosuke Hayashi, Tokyo (JP); Chisato Saito, Tokyo (JP); Yoshiya Shibata, Tokyo (JP)

(73) Assignee: OMRON Corporation, Kyoto (JP)

( * ) Notice: Subject to any disclaimer, the term of this patent is extended or adjusted under 35 U.S.C. 154(b) by 945 days.

(21) Appl. No.: 17/269,992

(22) PCT Filed: Oct. 18, 2019

(86) PCT No.: PCT/JP2019/041015
§ 371 (c)(1),
(2) Date: Feb. 19, 2021

(87) PCT Pub. No.: WO2020/110505
PCT Pub. Date: Jun. 4, 2020

(65) Prior Publication Data
US 2021/0331311 A1    Oct. 28, 2021

(30) Foreign Application Priority Data
Nov. 29, 2018 (JP) ................................ 2018-224285

(51) Int. Cl.
*B25J 9/16* (2006.01)
*B25J 13/08* (2006.01)
(Continued)

(52) U.S. Cl.
CPC ........... *B25J 9/1697* (2013.01); *B25J 9/1605* (2013.01); *B25J 9/163* (2013.01); *B25J 13/08* (2013.01);
(Continued)

(58) Field of Classification Search
CPC ........ B25J 9/1697; B25J 9/1605; B25J 9/163; B25J 13/08; G06T 7/70;
(Continued)

(56) References Cited

U.S. PATENT DOCUMENTS 11,494,632 B1 * 11/2022 Bai .......................... G06N 3/09
2018/0129912 A1   5/2018 Vernaza et al.
(Continued)

FOREIGN PATENT DOCUMENTS

| CN | 104160424 | 11/2014 |
|---|---|---|
| CN | 106068451 | 11/2016 |

(Continued)

OTHER PUBLICATIONS

Nguyen, Phuong DH, et al. "Transferring visuomotor learning from simulation to the real world for robotics manipulation tasks." 2018 IEEE/RSJ International Conference on Intelligent Robots and Systems (IROS). IEEE, 2018. (Year: 2018).*

(Continued)

*Primary Examiner* — Andrew T Chiusano
(74) *Attorney, Agent, or Firm* — JCIPRNET

(57) ABSTRACT

Provided is an image generation device capable of generating, on the basis of inputted images, a learning image for training an action of a robot which carries out a prescribed operation on a workpiece. The image generation device comprises: a first image acquisition unit which acquires a first image capturing a real operation space including the robot and not including the workpiece; a second image acquisition unit which acquires a second image in which a (Continued)

virtual operation space including a virtual robot corresponding to the robot and a virtual workpiece corresponding to the workpiece is rendered; and a learning apparatus so that, in response to an input of the first image and the second image, the apparatus outputs a third image obtained by transforming the second image such that at least the virtual robot included in the second image is made to approximate the robot included in the first image.

9 Claims, 17 Drawing Sheets

(51) Int. Cl.
    *G06N 20/00*     (2019.01)
    *G06T 7/70*     (2017.01)
    *G06V 10/764*     (2022.01)
    *G06V 10/82*     (2022.01)
    *G06V 20/52*     (2022.01)

(52) U.S. Cl.
    CPC .............. *G06N 20/00* (2019.01); *G06T 7/70* (2017.01); *G06V 10/764* (2022.01); *G06V 10/82* (2022.01); *G06V 20/52* (2022.01); *G06T 2207/20081* (2013.01); *G06T 2207/20212* (2013.01); *G06T 2207/30164* (2013.01)

(58) Field of Classification Search
    CPC . G06T 2207/20081; G06T 2207/20212; G06T 2207/30164; G06N 20/00; G06V 20/52; G06V 10/82; G06V 10/764
    See application file for complete search history.

(56) References Cited

U.S. PATENT DOCUMENTS

| | | | |
|---|---|---|---|
| 2018/0276501 | A1 | 9/2018 | Yamada et al. |
| 2018/0349527 | A1* | 12/2018 | Li .......................... G06N 3/08 |
| 2019/0057520 | A1* | 2/2019 | Cinnamon ............ G06T 15/503 |
| 2019/0251401 | A1* | 8/2019 | Shechtman ............ G06V 10/82 |
| 2020/0279134 | A1* | 9/2020 | Bousmalis ............. G06N 3/006 |
| 2021/0086355 | A1* | 3/2021 | Park ..................... G06V 10/774 |
| 2022/0284624 | A1* | 9/2022 | Nimmagadda ........... G06T 7/75 |
| 2024/0100693 | A1* | 3/2024 | Ho ......................... B25J 9/1653 |

FOREIGN PATENT DOCUMENTS

| | | |
|---|---|---|
| CN | 106952308 | 7/2017 |
| JP | 2017185577 | 10/2017 |
| JP | 2018151843 | 9/2018 |
| JP | 2018161692 | 10/2018 |
| KR | 20170113724 | 10/2017 |
| WO | 2018146770 | 8/2018 |

OTHER PUBLICATIONS

Rahmatizadeh, Rouhollah, et al. "Vision-based multi-task manipulation for inexpensive robots using end-to-end learning from demonstration." 2018 IEEE international conference on robotics and automation (ICRA). IEEE, 2018. (Year: 2018).*

Bousmalis, Konstantinos, et al. "Using simulation and domain adaptation to improve efficiency of deep robotic grasping." 2018 IEEE international conference on robotics and automation (ICRA). IEEE, 2018. (Year: 2018).*

Inoue, Tadanobu, et al. "Transfer learning from synthetic to real images using variational autoencoders for robotic applications." arXiv preprint arXiv:1709.06762 (2017). (Year: 2017).*

"Office Action of China Counterpart Application", issued on Dec. 13, 2023, with English translation thereof, p. 1-p. 15.

"International Search Report (Form PCT/ISA/210) of PCT/JP2019/041015", mailed on Dec. 24, 2019, with English translation thereof, pp. 1-4.

"Written Opinion of the International Searching Authourity (Form/ISA/237) of PCT/JP2019/041015", mailed on Dec. 24, 2019, with English translation thereof, pp. 1-6.

* cited by examiner

IMAGE GENERATION DEVICE, ROBOT TRAINING SYSTEM, IMAGE GENERATION METHOD, AND NON-TRANSITORY COMPUTER READABLE STORAGE MEDIUM

CROSS-REFERENCE TO RELATED APPLICATION

This application is a 371 application of the International PCT application serial no. PCT/JP2019/041015, filed on Oct. 18, 2019, which claims the priority benefits of Japan Patent Application No. 2018-224285, filed on Nov. 29, 2018. The entirety of each of the above-mentioned patent applications is hereby incorporated by reference herein and made a part of this specification.

BACKGROUND

Technical Field

The present invention relates to an image generation device, a robot training system, an image generation method, and an image generation program.

Background Art

In recent years, as a control method of a robot, a control method called a visual servo system has been proposed. For example, in controlling a robot that grips a workpiece, an image including the workpiece is acquired as an input image by a visual sensor such as a camera, and a control command for the robot to operate to grip the workpiece is generated on the basis of a positional relationship between the robot and the workpiece identified from the image. In addition, in order to generate such a control command, machine learning for generating a control command suitable for the acquired image is performed (for example, Patent Literature 1).

Incidentally, in order to perform machine learning as described above, teacher data having learning images that show positional relationships between a robot and various types of workpieces, or workpieces placed in various positions and orientations, and control commands for the robot to perform a target gripping operation on a workpiece shown in each learning image is required, and in general, as the amount of teacher data increases, more accurate learning can be performed. Therefore, as the learning images, for example, a large number of images showing different types of workpieces or a large number of images showing different positional relationships between the workpieces and the robot are required.

CITATION LIST

Patent Literature

Patent Literature 1 Japanese Patent Laid-Open No. 2017-185577

SUMMARY

Technical Problem

As a learning image, for example, a captured image that captures a real operation space can be used, or a virtual image in which a virtual operation space that imitates a robot and a workpiece is rendered can be used. However, it is not easy to capture a large number of images of the real operation space in which various workpieces are disposed to generate the captured images. On the other hand, since the virtual image as described above can be generated by a computer, a large number of images can be easily generated. However, since it is an artificially generated image, it is not possible to completely render a real robot such as the robot shown in the captured image. For that reason, when the virtual image is used, for example, it may not be possible to accurately identify a positional relationship between the robot and the workpiece, and in such a case, there is a concern that the control command for the target gripping operation may not be output.

The present invention has been made to solve the above problems, and an objective of the present invention is to provide an image generation device, a robot training system, an image generation method, and an image generation program in which a learning image suitable for training an action of a robot which carries out a prescribed operation on a workpiece can be easily generated on the basis of an input image.

Solution to Problem

An image generation device according to the present invention is an image generation device that generates a learning image for training an action of a robot which carries out a prescribed operation on a workpiece on the basis of an input image, and includes: a first image acquisition unit which acquires a first image of a real operation space including the robot and not including the workpiece; a second image acquisition unit which acquires a second image in which a virtual operation space including a virtual robot corresponding to the robot and a virtual workpiece corresponding to the workpiece is rendered; and a learner, which is trained by machine learning, in which the first image and the second image are input, and a third image obtained by converting the second image such that at least the virtual robot included in the second image is made to approximate the robot included in the first image is output.

In the above image generation device, the learner further includes: a generator which generates the third image; a fourth image acquisition unit which acquires a fourth image in which the virtual workpiece is added to the first image on the basis of the second image; and a discriminator connected to the generator and the fourth image acquisition unit, and the machine learning may be configured to include alternating a first training step of training the discriminator to discriminate whether or not the third image input to the discriminator is the fourth image, and a second training step of training the generator to generate the third image such that the discriminator makes a mistake in the discrimination.

In the image generation device, the learner may further include a predictor trained such that the third image is input and performance of the operation performed by the robot is output.

A robot training system according to the present invention includes an imaging unit which acquires the input image, the robot, and any of the image generation devices described above, and the robot is trained to perform a prescribed processing operation from the input image in accordance with learning data including the third image generated by the image generation device.

The robot training system may further include a simulator which simulates the operation of the robot and an evaluation unit which evaluates an operation performed by the simulator.

An image generation method according to the present invention is an image generation method that generates a learning image for training an action of a robot which carries out a prescribed operation on a workpiece on the basis of an input image, and includes the steps of: acquiring a first image of a real operation space including the robot and not including the workpiece; acquiring a second image in which a virtual operation space including a virtual robot corresponding to the robot and a virtual workpiece corresponding to the workpiece is rendered; and inputting the first image and the second image and outputting a third image obtained by converting the second image such that at least the virtual robot included in the second image is made to approximate the robot included in the first image.

An image generation program causes a computer that generates a learning image for training an action of a robot which carries out a prescribed operation on a workpiece on the basis of an input image to execute steps of: acquiring a first image of a real operation space including the robot and not including the workpiece; acquiring a second image in which a virtual operation space including a virtual robot corresponding to the robot and a virtual workpiece corresponding to the workpiece is rendered; and inputting the first image and the second image and outputting a third image obtained by converting the second image such that at least the virtual robot included in the second image is made to approximate the robot included in the first image.

Advantageous Effects of Invention

According to the present invention, it is possible to easily generate a learning image suitable for training an action of a robot which carries out a prescribed operation on a workpiece on the basis of an input image.

DESCRIPTION OF EMBODIMENTS

Hereinafter, embodiments of an image generation device, a robot training system, an image generation method, and an image generation program according to the present invention will be described with reference to the drawings. However, it goes without saying that the embodiments described below are merely examples of the present invention in all respects, and various improvements and modifications can be made without departing from the scope of the present invention. That is, in carrying out the present invention, specific configurations according to the embodiments may be appropriately adopted. Also, although the data appearing in the present embodiments is described in natural language, more specifically, it is specified in a pseudo language, a command, a parameter, a machine language, or the like that can be recognized by a computer.

1. Application Example

Figure 1:
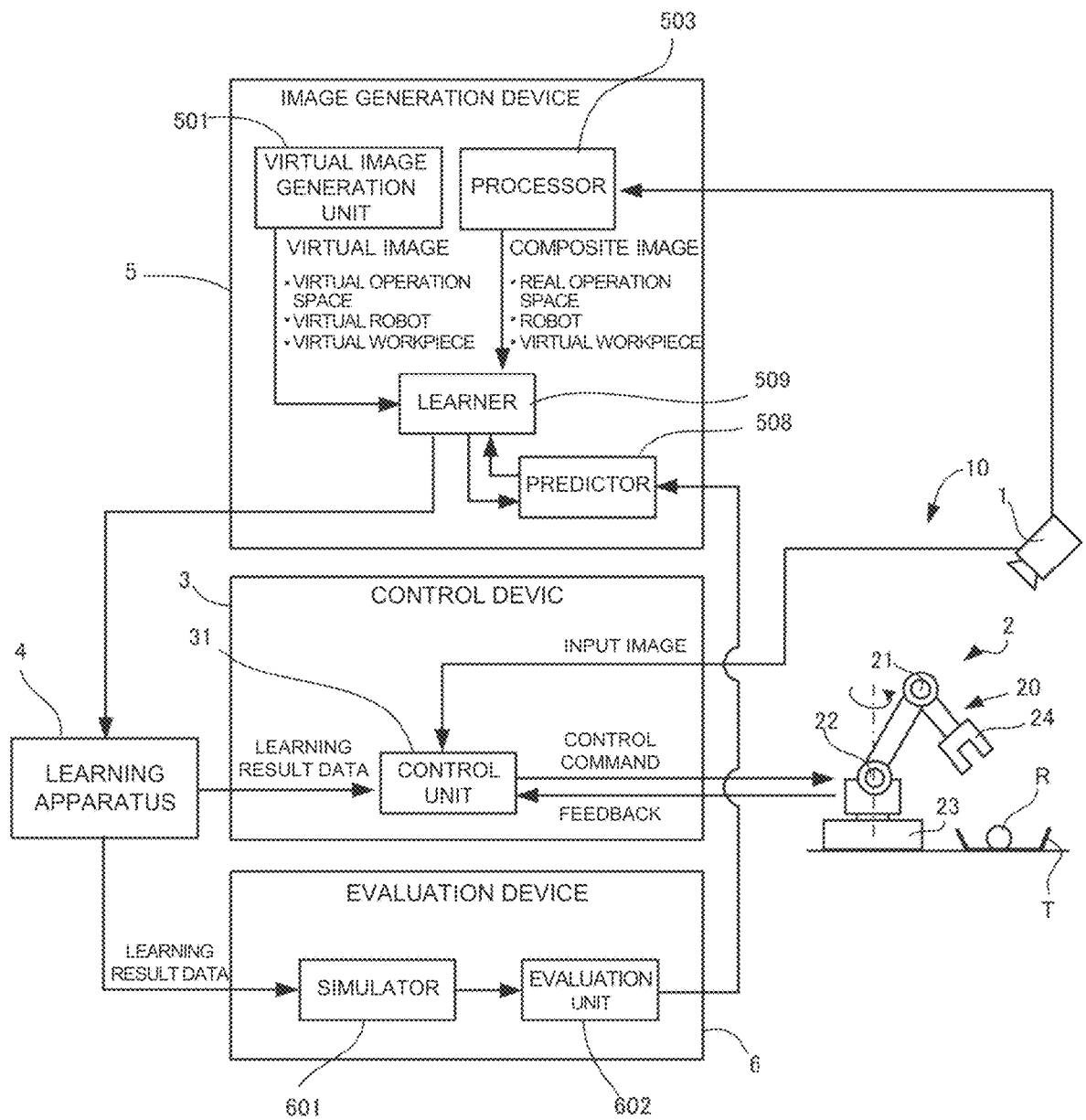
FIG. 1 is a block diagram showing an example of a situation in which a processing system of the present invention is applied to a gripping system.

First, an example of a situation in which the present invention is applied will be described with reference to FIG. 1. FIG. 1 schematically illustrates an example of a situation in which a robot training system including an image generation device according to the present invention is applied to a gripping system 100. However, an application range of the present invention is not limited to examples of the gripping system illustrated below. That is, the present invention is applicable to all robot training systems that acquire an input image and train a robot to perform a prescribed operation on a workpiece on the basis of the input image.

As illustrated in FIG. 1, the gripping system 100 according to the present embodiment has a visual servo device 10 including a camera 1, a robot 2 that grips a workpiece R, and a control device 3 that controls an action of the robot 2, a learning apparatus 4 for training the action of the robot 2, an image generation device 5 that generates a learning image used in the learning apparatus 4, and an evaluation device 6 that evaluates learning results of the robot 2. First, the visual servo device 10 will be described.

In the visual servo device 10, a visual field of the camera 1 is adjusted such that a real operation space in which the robot 2 performs an operation of gripping the workpiece R is captured by the camera 1. As an example, the robot 2 includes an arm 20 having two bending joints 21 and 22, and a support base 23 that rotatably supports the arm 20 around a vertical axis. Also, a gripper 24 for gripping the workpiece R is attached to a tip of the arm 20. In addition, rotation of the bending joints 21 and 22 and the arm 20 with respect to the support base 23, and gripping of the workpiece R by the gripper 24 are performed by a drive motor that is not shown. A control command for the drive motor is output from the control device 3, whereby the robot 2 executes a target operation of gripping the workpiece R and moving it to a prescribed position. That is, bending angles of the bending joints 21 and 22, a rotation angle of the arm 20 with respect to the support base 23, and a degree of gripping of the gripper 24 are controlled to execute the target work.

In addition, such an operation of the robot 2 is performed on the basis of an image captured by the camera 1. That is, the real operation space is captured by the camera 1, and an input image in which the workpiece R and the robot 2 are captured is acquired. Moreover, a control unit 31 of the control device 3 identifies an action of the robot 1 required to grip the workpiece R from a type, a position, an orientation or the like of the workpiece R reflected in the input image and a positional relationship between the workpiece R and the robot 2, and the control unit 31 outputs a control command necessary for the operation to the robot 2.

In order to output an appropriate control command corresponding to the input image, the control unit 31 is machine-learned by the learning apparatus 4 and performs control of outputting a control command from the input image on the basis of learning result data generated by the learning apparatus 4. Here, for machine learning of the action of the robot 2, teacher data having learning images that show positional relationships between a robot and various types of workpieces, or workpieces placed in various orientations, and a control command for the robot to perform a target gripping operation on a workpiece shown in each learning image is required, and in general, as the amount of teacher data increases, more accurate learning can be performed. In the present embodiment, the learning images used for such learning are generated by the image generation device 5.

In the present embodiment, the image generation device 5 generates a learning image using two types of images. One image is a virtual image (a second image) in which the operation space (including a tray T containing the workpiece), the robot 2, and the workpiece R are all virtually rendered, and this virtual image is generated by a virtual image generation unit 501. The other image is a composite image (a fourth image) in which only the workpiece R among the operation space, the robot 2, and the workpiece R is virtually generated and this virtual product image is combined with a real image (a first image) of the operation space and the robot 2 captured by the camera 1. This composite image is generated by a processor 503. Then, using these two images, the learning image (a third image) is generated by a learner 509.

Here, since the virtual image is just a computer-generated real operation space, it may not faithfully render the real operation space. For that reason, when learning is performed with the learning apparatus 4 using such a virtual image as it is, it may not be possible to generate appropriate learning result data. For example, in a case in which a positional relationship between the workpiece R and the robot 2 shown in the virtual image cannot faithfully reproduce the positional relationship in the real operation space, only inaccurate positional relationships can be identified from the virtual image, which may not output a correct control command for performing the target operation. Therefore, in the present embodiment, the composite image in which only the workpiece R is virtually rendered and combined with the captured image of the operation space and the robot 2 captured by the camera 1 is used. In addition, using the two images of the composite image and the virtual image, the learner 509 generates the learning image obtained by converting the virtual image to approximate the composite image. That is, since the composite image uses real images except for the image of the workpiece, it almost faithfully shows the real operation space, and by using this, the learning image that approximates the real operation space is generated from the virtual image. Also, since the composite image uses a real image only for the robot and the workpiece is generated by a computer, it can be easily generated as compared with a case of preparing captured images for all learning images.

Further, before transmitting such a generated learning image to the learning apparatus 4, a predictor 508 predicts whether or not the image is appropriate. This predictor 508 has been trained to output an evaluation as to whether or not the learning image can perform appropriate control. Therefore, by using this predictor 508, it is possible to confirm suitability of the learning image before transmitting it to the learning apparatus 4.

The learning image generated in this way is transmitted to the learning apparatus 4 and used for learning of the control unit 31. The learning result data generated by the learning apparatus 4 may be used as it is by the control unit 31, but in the present embodiment, evaluation is performed by the evaluation device 6 prior thereto. That is, the learning result data generated by the learning apparatus 4 is transmitted to the evaluation device 6, and a simulator 601 of the evaluation device 6 simulates the operation performed by the robot 2. Then, the result is evaluated by an evaluation unit 602. The evaluation here can be various evaluations related to the gripping operation, for example, the probability that the robot 2 can grip the workpiece R and the probability that the robot 2 can grip a correct position of the workpiece R.

Then, when the evaluation unit 602 determines that the learning result data is an appropriate evaluation, the learning result data is transmitted to the control unit 31 as being usable in a real operation. Further, the evaluation performed by the evaluation unit 602 can retrain the predictor 508 described above, whereby prediction accuracy of the predictor 508 can be improved.

Although the configuration of the gripping system according to the present embodiment can be changed in various ways, in particular, an example using the image generation device 5 in which the above-mentioned learner 509 is configured by a generative adversarial network (GAN), which is one type of machine learning, will be described below. The details will be described below.

2. Configuration Example

<2-1. Hardware Configuration
<2-1-1. Overview of Gripping System>

Figure 2:
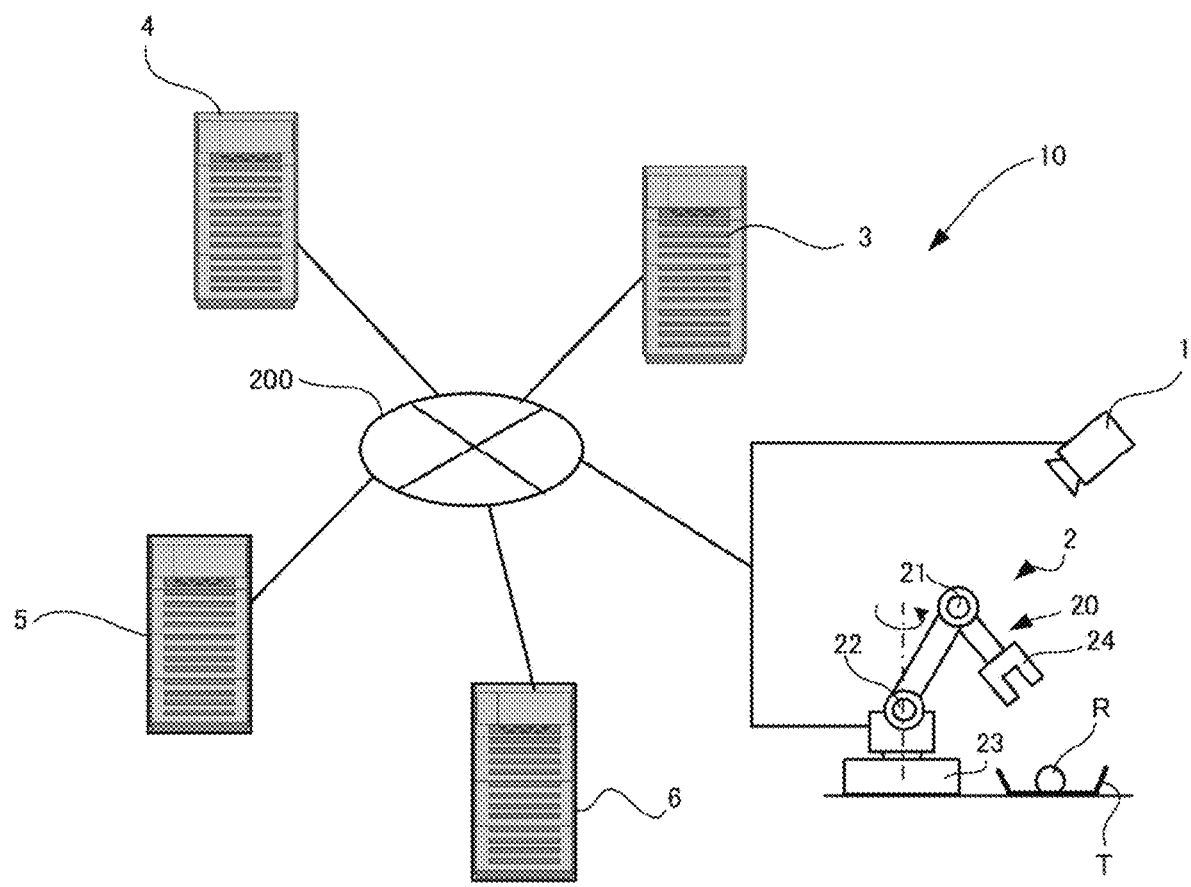
FIG. 2 is a schematic configuration diagram of a gripping system according to an embodiment of the present invention.

The gripping system 100 including an image generation device 5 according to the present embodiment will be described with reference to FIG. 2. As shown in FIG. 2, this gripping system includes a control device 3, an image generation device 5, a learning apparatus 4 of the control device 3, and an evaluation device 6 connected via a network 200. In addition, a robot 2 and a camera 1 that captures a real operation space including the robot 2 are connected to the control device 3 to form a visual servo device 10. A type of network between the control device 3, the learning apparatus 4, the image generation device 5, and the evaluation device 6 does not have to be particularly limited, and the type of network may be appropriately selected from, for example, the Internet, a wireless communication network, a mobile communication network, a telephone network, a dedicated network, and the like.

Also, in the example of FIG. 2, the control device 3, the learning apparatus 4, the image generation device 5, and the evaluation device 6 are separate computers. However, the configuration of the gripping system does not have to be limited to such examples. At least one pair among the control device 3, the learning apparatus 4, the image generation device 5, and the evaluation device 6 may be an integrated computer. Further, the control device 3, the learning apparatus 4, the image generation device 5, and the evaluation device 6 may each be configured of a plurality of computers.

<2-1-2. Control Device>

Figure 3:
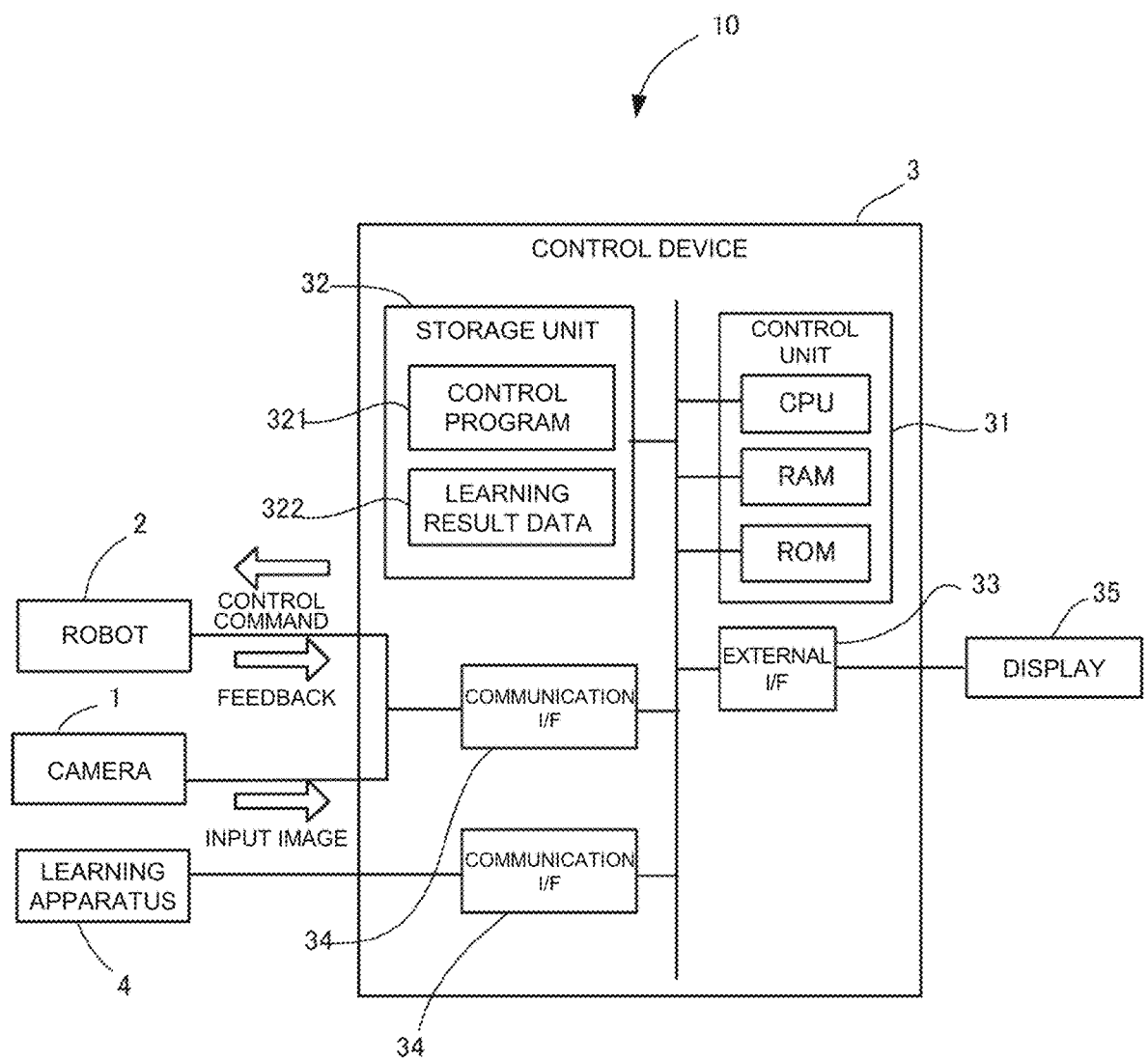
FIG. 3 is a block diagram showing a hardware configuration of a control device used in the system of FIG. 2.

Next, an example of a hardware configuration of the control device 3 according to the present embodiment will be described with reference to FIG. 3. FIG. 3 schematically illustrates an example of the hardware configuration of the control device 3 according to the present embodiment.

The control device 3 is a computer to which a control unit 31, a storage unit 32, an external interface 33, and a communication interface 34 are electrically connected. Thus, the control device 3 is configured to control an operations of the camera 1, a gripping device 2, and a display 35, which will be described later. Also, in FIG. 3, the external interface 33 and the communication interface 34 are described as an "external I/F" and a "communication I/F." This point is the same for various devices described later.

The control unit 31 includes a CPU, a RAM, a ROM, and the like and is configured to execute various information processing on the basis of programs and data. The storage unit 32 is configured of, for example, a RAM, a ROM, or the like and stores a control program 321, learning result data 322, and the like. The control program 321 is a program for causing the control device 3 to execute a control process of the robot 2 and performs the control process on the basis of the learning result data 322 generated by the learning apparatus 4. The control unit 31 is configured to execute processing of each step, which will be described later, by interpreting and executing the control program 321.

The external interface 33 is an interface for connecting to an external device and is appropriately configured depending on the external device to be connected. In the present embodiment, the external interface 33 is connected to the display 35. The display 35 is used, for example, to display a status of the gripping device 2. The display 35 is not particularly limited as long as the status can be displayed, and a known liquid crystal display, a touch panel display, or the like may be used. In addition, an input device, an output device, and the like can be appropriately connected to the external interface 33.

The communication interface 34 is, for example, a wired local area network (LAN) module, a wireless LAN module, or the like and is an interface for performing wired or wireless communication. That is, the communication interface 34 is an example of a communication unit configured to communicate with another device. In the present embodiment, the camera 1, the gripping device 2, and the learning apparatus 4 are connected to each other via the network 200.

In addition, with respect to a specific hardware configuration of the control device 3, omissions, substitutions, and additions of components can be appropriately made depending on embodiments. The control unit 31 may include a plurality of processors. Also, the control unit 31 may be configured of an FPGA. The storage unit 32 may be configured of a RAM and a ROM included in the control unit 31. Also, the storage unit 32 may be configured of an auxiliary storage device such as a hard disk drive or a solid state drive. The control device 3 may be a general-purpose desktop PC, a general-purpose tablet PC, or the like, depending on an workpiece to be controlled, in addition to an information processing device designed exclusively for a provided service. The above points are the same in the learning apparatus 4, the image generation device 5, and the evaluation device 6, which will be described later.

<2-1-3. Robot>

Next, the robot 2 will be described. An outline of the robot 2 is as described above, but a more detailed example will be described.

Drive motors that drive each of the bending joints 21 and 22 and rotate the arm are configured of a servo motor, a brushless motor, and the like. In addition, an angle sensor that can detect an angle, such as a rotary encoder, is attached to each of the bending joints 21 and 22 and a base end portion of the arm 20.

Further, the gripper 24 may be equipped with a force sensor that detects a force acting on the gripper 24. Thus, the robot 2 can be configured to detect the force acting on the gripper 24.

Also, with respect to a specific configuration of the robot 2, omissions, substitutions, and additions of components can be appropriately made depending on embodiments. For example, the number of bending joints 21 and 22 may be appropriately selected depending on embodiments. Further, torque sensors may be attached to the bending joints 21 and 22 in addition to the angle sensor. As a result, bending angles of the bending joints 21 and 22 can be controlled by torque.

Further, the robot 2 can feed back results of an operation performed on the basis of a control command to the control device 3 and reflect them in learning of the control device 3, which will be described later.

<2-1-4. Camera>

The camera 1 is adapted to capture the real operation space including the robot 2 and the workpiece R. Also, the camera 1 may be fixed at a predetermined position, or may be configured such that an imaging direction (orientation) thereof can be changed by a motor or the like. For the camera 1, a general digital camera, a general video camera, a general 360-degree camera, or the like may be used, and the camera 1 may be a camera for visible light photography or infrared light photography.

<2-1-5. Learning Apparatus>

Figure 4:
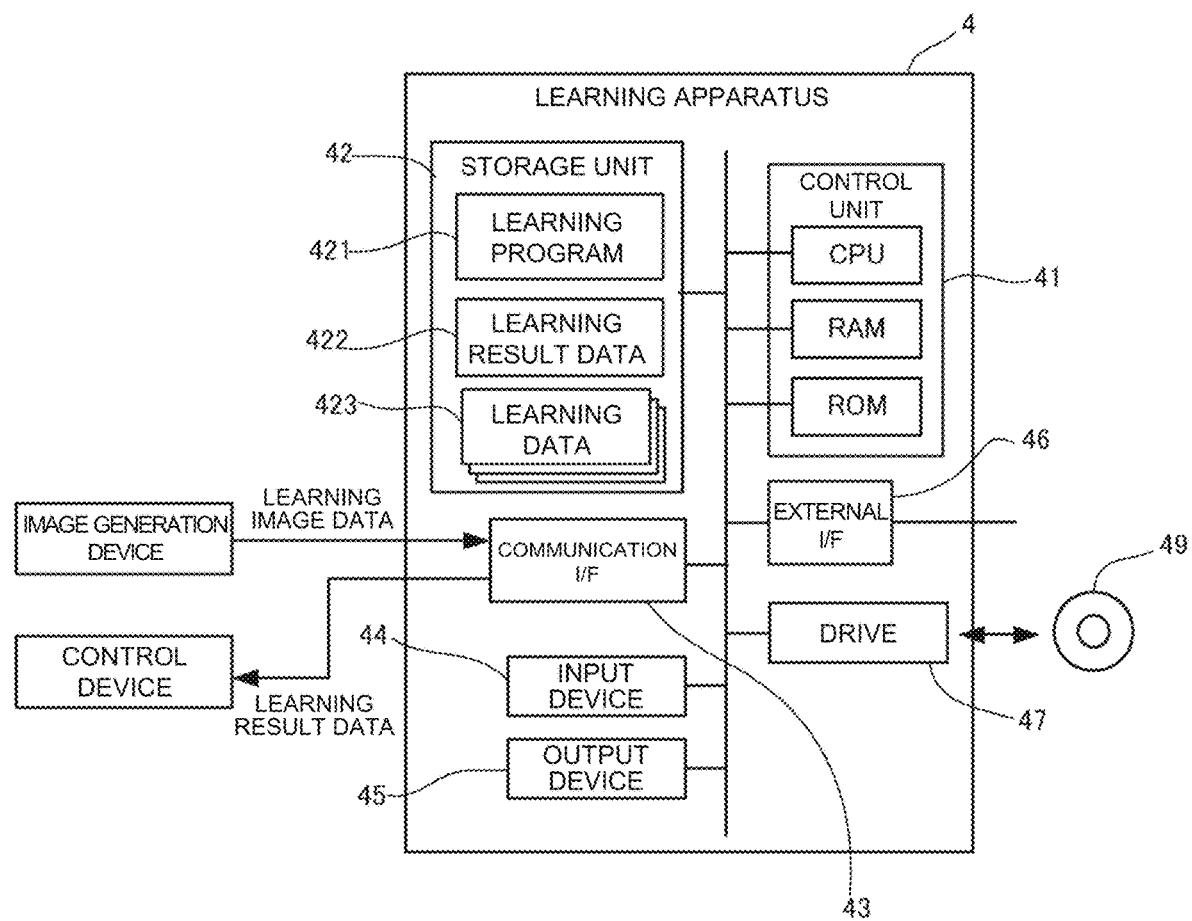
FIG. 4 is a block diagram showing a hardware configuration of a learning apparatus used in the system of FIG. 2.

FIG. 4 is a block diagram showing a learning apparatus according to the present embodiment. As shown in FIG. 4, the learning apparatus 4 according to the present embodiment is for learning the control unit 31 of the control device 3 and is a computer to which a control unit 41, a storage unit 42, a communication interface 43, an input device 44, an output device 45, an external interface 46, and a drive 47 are electrically connected.

The control unit 41 includes a central processing unit (CPU), a random access memory (RAM), a read only memory (ROM), and the like and controls each component in accordance with information processing. The storage unit 42 is, for example, an auxiliary storage device such as a hard disk drive or a solid state drive, and stores a learning program 421, learning result data 422, learning data 423, and the like executed by the control unit 41.

The learning program 421 is a program for causing the learning apparatus 4 to execute a learning process of machine learning for a neural network or the like. The learning result data 422 is data of results of the learning process and is data for setting the control unit 31 of the control device 3. The learning data 423 is data for performing learning, and the learning data 423 includes learning images generated by the image generation device 5, which will be described later. The details will be described later.

The communication interface 43 and the external interface 46 are the same as those shown in the control device 3. The input device 44 is a device for performing an input through, for example, a mouse, a keyboard, or the like, and the output device 45 is a device for performing an output to, for example, a display, a speaker, or the like.

The drive 47 is, for example, a compact disk (CD) drive, a digital versatile disk (DVD) drive, or the like and is a device for reading a program stored in a storage medium 49. A type of the drive 47 may be appropriately selected depending on a type of the storage medium 49. The learning program 421 and/or the learning result data 422 may be stored in the storage medium 49.

The storage medium 49 is a medium that stores information such as recorded programs by means of electrical, magnetic, optical, mechanical, or chemical actions so that computers and other devices, machines, or the like can read the information such as the programs. The image processing device 1 may acquire the learning program 421 and/or the learning result data 422 from the storage medium 49.

Here, FIG. 4 illustrates a disc type storage medium such as a CD or DVD as an example of the storage medium 49. However, the type of the storage medium 49 is not limited to the disc type and may be other than the disc type. Examples of the storage medium other than the disc type include semiconductor memories such as flash memories.

<2-1-6. Image Generation Device>

Figure 5:
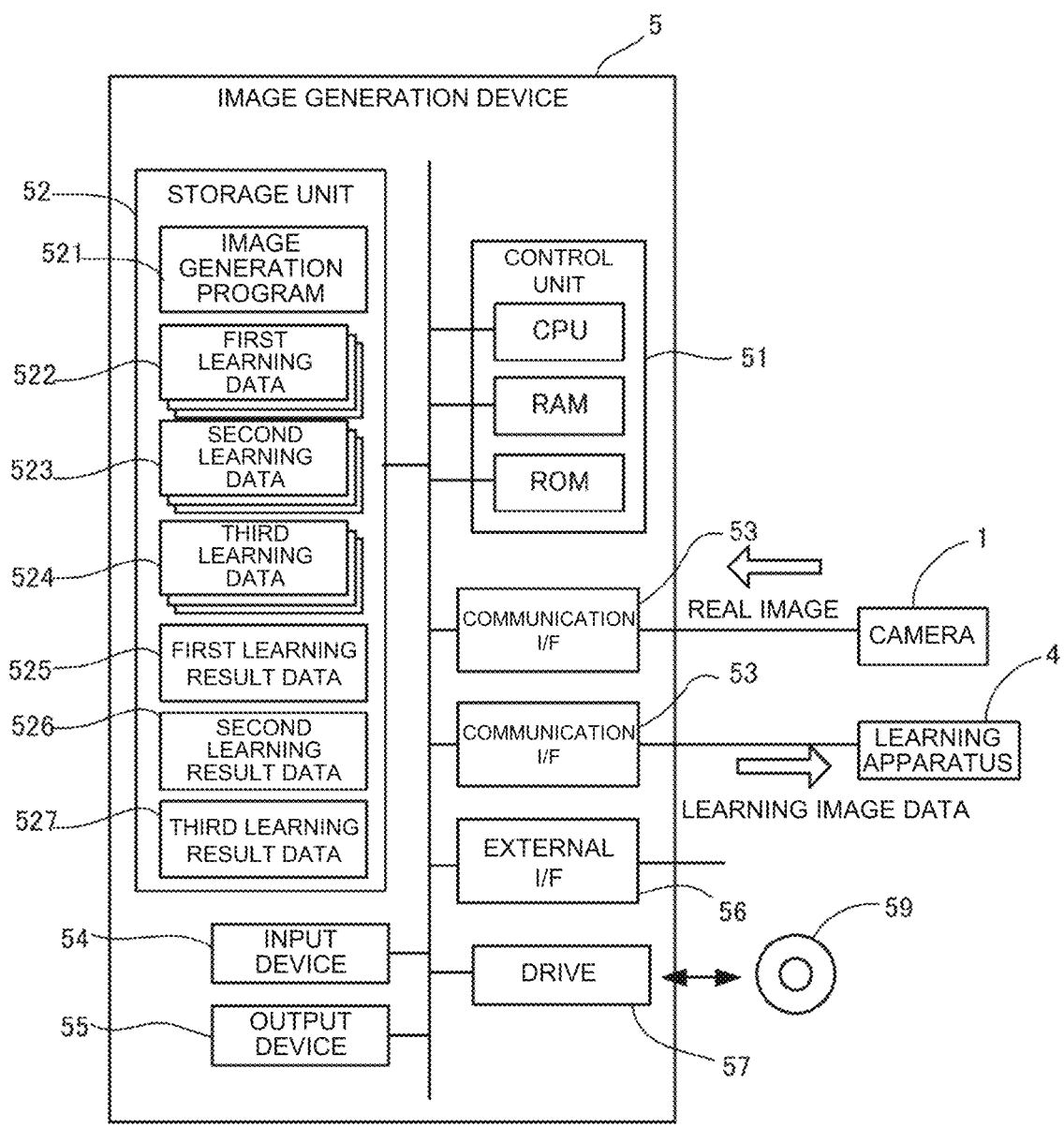
FIG. 5 is a block diagram showing a hardware configuration of an image generation device used in the system of FIG. 2.

FIG. 5 is a block diagram showing the image generation device according to the present embodiment. As shown in FIG. 5, the image generation device 5 according to the present embodiment is a computer to which a control unit 51, a storage unit 52, a communication interface 53, an input device 54, an output device 55, an external interface 56, and a drive 57 are electrically connected.

The control unit 51 to drive 57 and the storage medium 59 have the same configurations as the control unit 41 to drive 47 and the storage medium 49 of the learning apparatus 4, respectively. However, the storage unit 52 of the image generation device 5 mainly stores an image generation program 521 executed by the control unit 51, first learning data 522, second learning data 523, and third learning data 524 used respectively for learning a generator 504, a discriminator 505, and a predictor 508, which will be described later, and first learning result data 525, second learning result data 526, and third learning result data 527 created by executing the learning program 521.

Similar to the learning apparatus 4, various programs 521 and data 522 to 527 may be stored in the storage medium 59. In response thereto, the image generation device 5 may acquire at least one of these programs 521 and data 522-527 from the storage medium 59.

Further, the camera 1 is connected to the communication interface 53 via the network 200, and an image of the real operation space captured by the camera 1 is transmitted thereto. However, as will be described later, a workpiece R is not included in the image of the real operation space used here.

<2-1-7. Evaluation Device>

Figure 6:
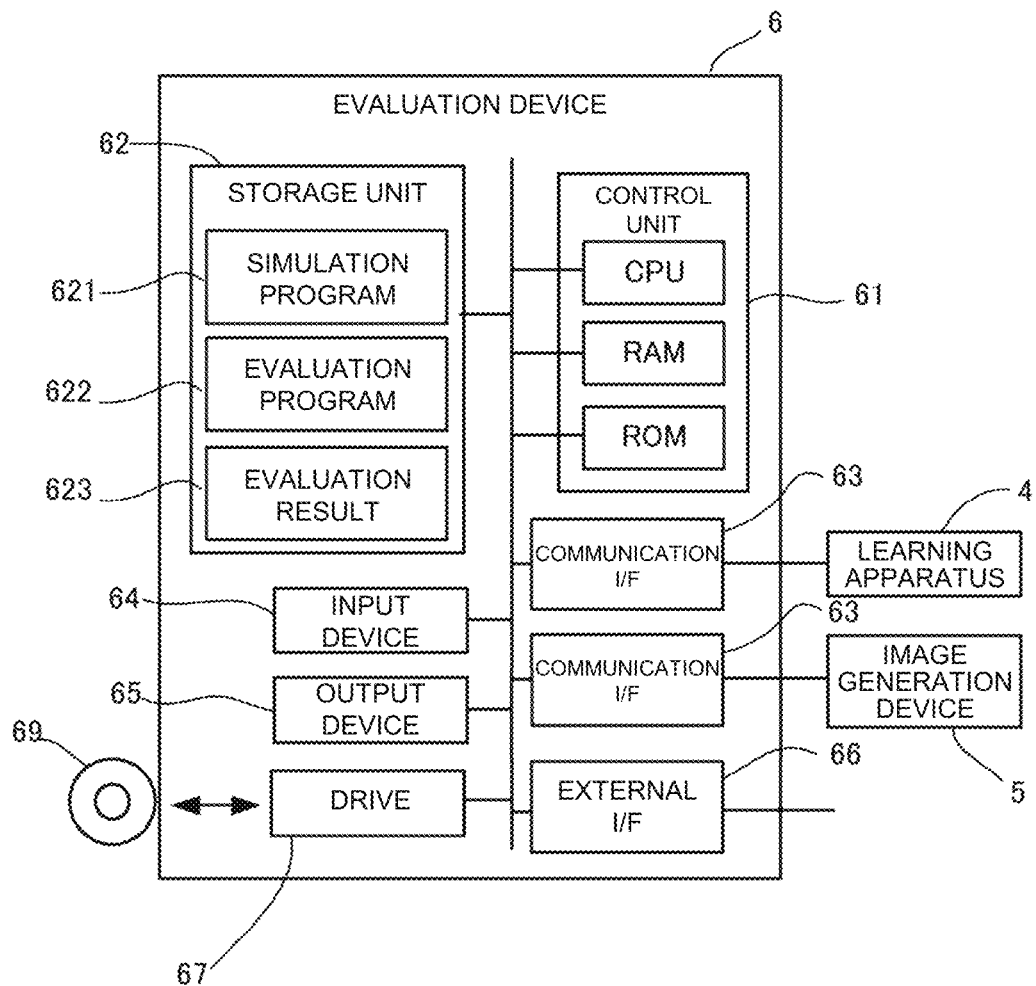
FIG. 6 is a block diagram showing a hardware configuration of an evaluation device used in the system of FIG. 2.

FIG. 6 is a block diagram showing the evaluation device according to the present embodiment. As shown in FIG. 6, the evaluation device 6 according to the present embodiment is a computer to which a control unit 61, a storage unit 62, a communication interface 63, an input device 64, an output device 65, an external interface 66, and a drive 67 are electrically connected.

The control units 61 to the drive 67 and the storage medium 69 have the same configurations as the control units 41 to drive 47 and the storage medium 49 of the learning apparatus 4, respectively. However, the storage unit 62 of the evaluation device 6 stores a simulation program 621 executed by the evaluation device 6, an evaluation program 622 for evaluating simulation results, evaluation results 623, and the like.

Also, similarly to the learning apparatus 4, various programs 621 and 622 may be stored in the storage medium 69. Accordingly, the evaluation device 6 may obtain at least one of these programs 621 and 622 from the storage medium 69.

Further, the learning apparatus 4 and the image generation device 5 are connected to the communication interface 63 via the network 200. As a result, the evaluation device 6 acquires the learning result data 422 from the learning apparatus 4 via the network 200, transmits the generated evaluation results 623 to the image generation device 5, and uses them for learning the predictor 508.

<2-2. Software Configuration>

<2-2-1. Image Generation Device>

Figure 7:
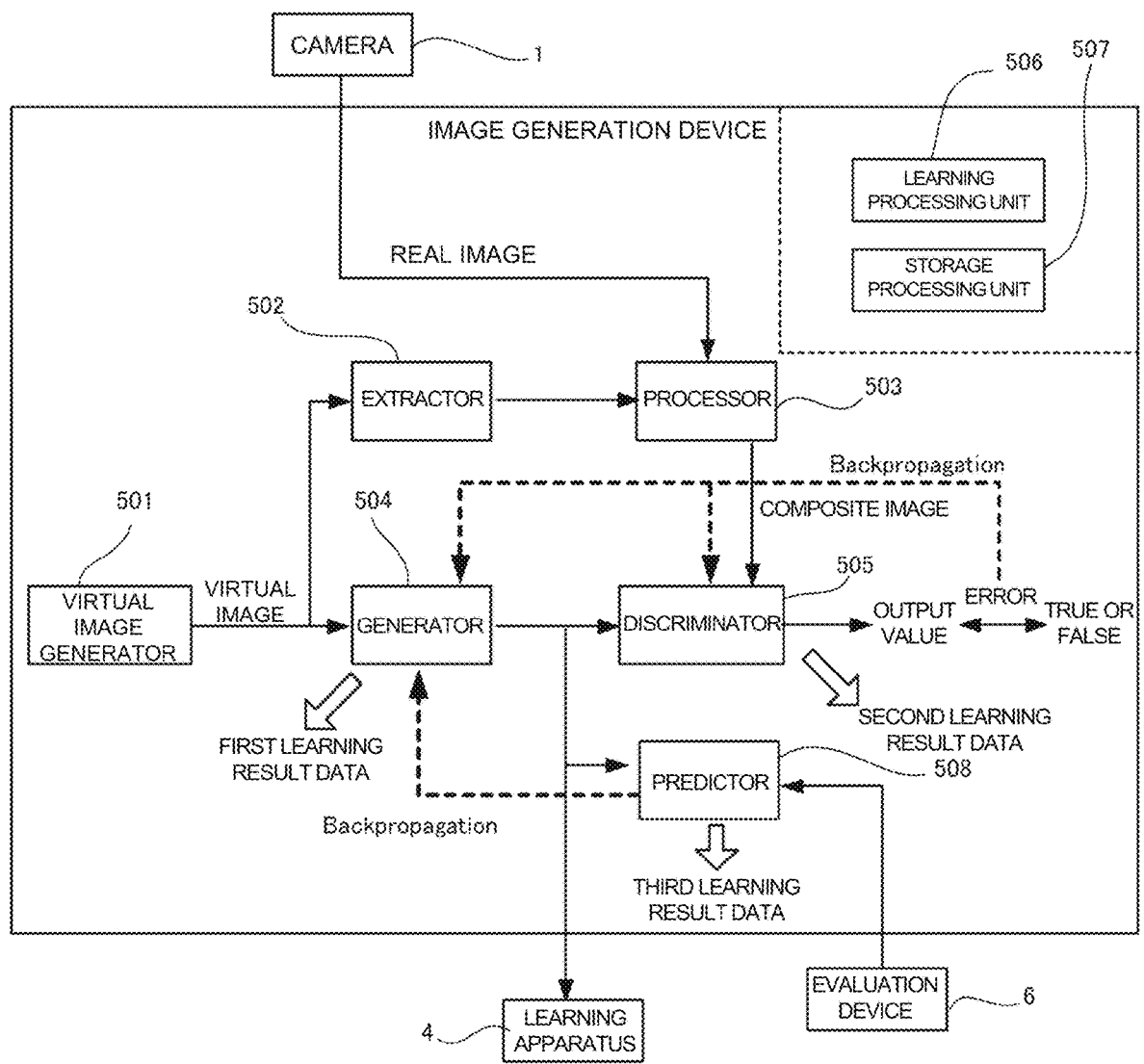
FIG. 7 is a functional block diagram of the image generation device of FIG. 5.
Figure 8A:
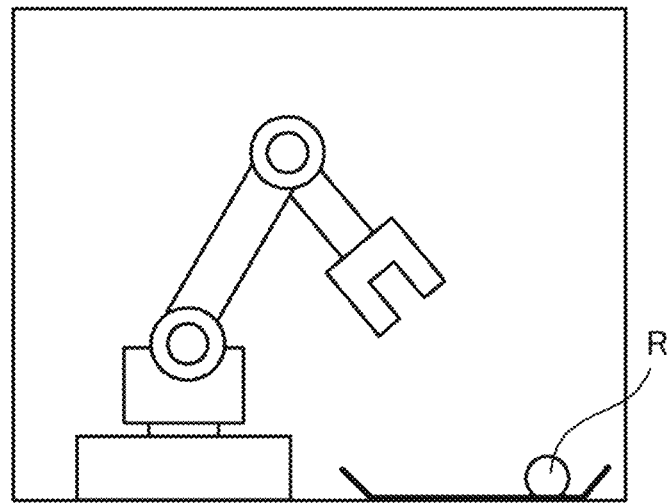
FIG. 8A is a diagram showing an example of a virtual image.
Figure 8B:
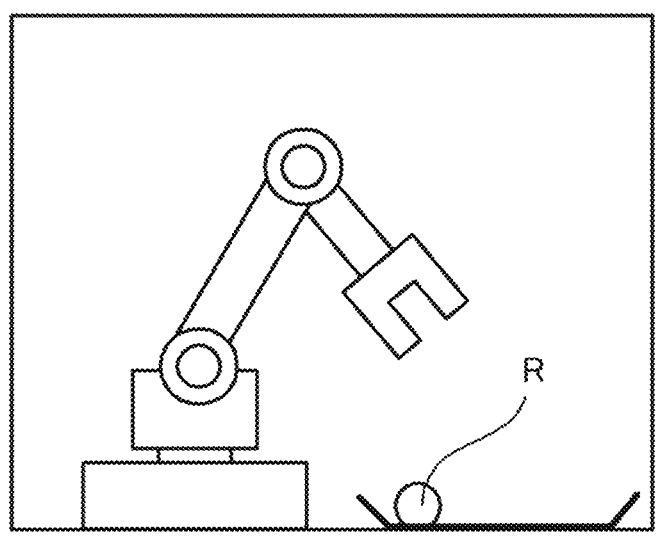
FIG. 8B is a diagram showing an example of a virtual image.
Figure 8C:
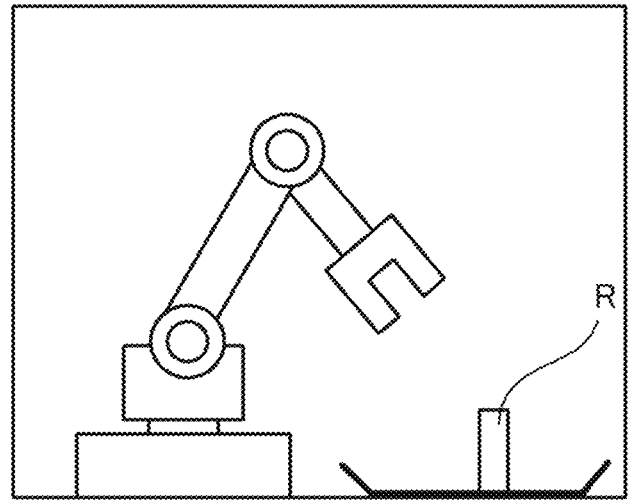
FIG. 8C is a diagram showing an example of a virtual image.
Figure 8D:
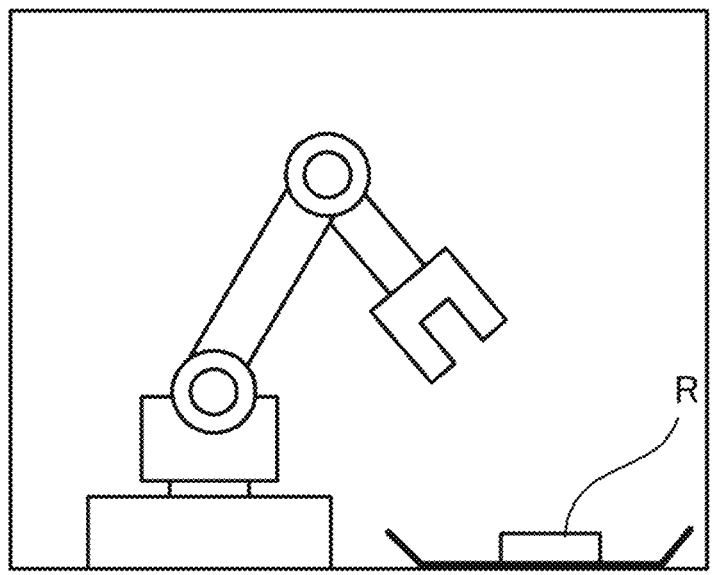
FIG. 8D is a diagram showing an example of a virtual image.

Next, a software configuration of the image generation device 5 will be described with reference to FIG. 7. As shown in FIG. 7, the control unit 51 of the image generation device 5 functions as a computer which interprets and executes the image generation program 521 stored in the storage unit 52 using the CPU when the image generation program 521 is developed into the RAM, and includes a virtual image generation unit (a second image acquisition unit) 501, an extractor 502, a processor (a first image acquisition unit and a fourth image acquisition unit) 503, a generator 504, a discriminator 505, and a learning processing unit 506, a storage processing unit 507, and a predictor 508.

The virtual image generation unit 501 generates a virtual image in which the operation space, the robot 2, and the workpiece R are all virtually generated. Since this virtual image becomes a basis of the learning images, a large number of images are generated. For example, as shown in FIGS. 8A to 8D, a large number of virtual images having different types, positions, orientations, and the like of the workpiece R are generated. In addition, it is also possible to generate virtual images in which lighting (illuminance, color, orientation, etc.) in the operation space and an imaging position of the camera 1 are changed. The workpiece R in the virtual images can include position information.

The extractor 502 extracts information about features of the robot and the workpiece in the operation space, such as a shape, a position, and orientation of a product for each virtual image from the created plurality of virtual images.

Figure 9A:
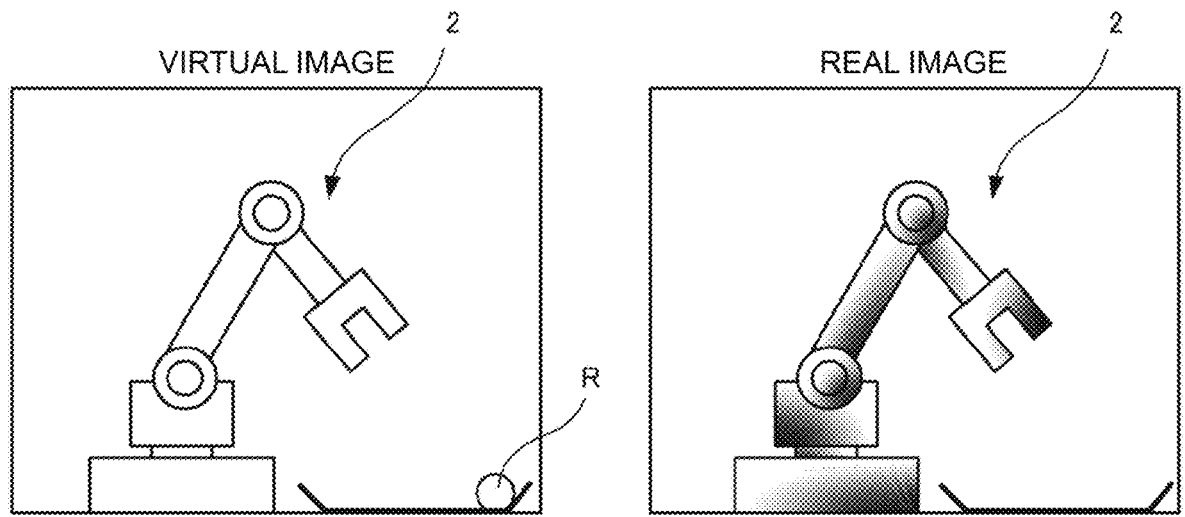
FIG. 9A is a diagram showing an example of correspondence between a virtual image and a real image.
Figure 9B:
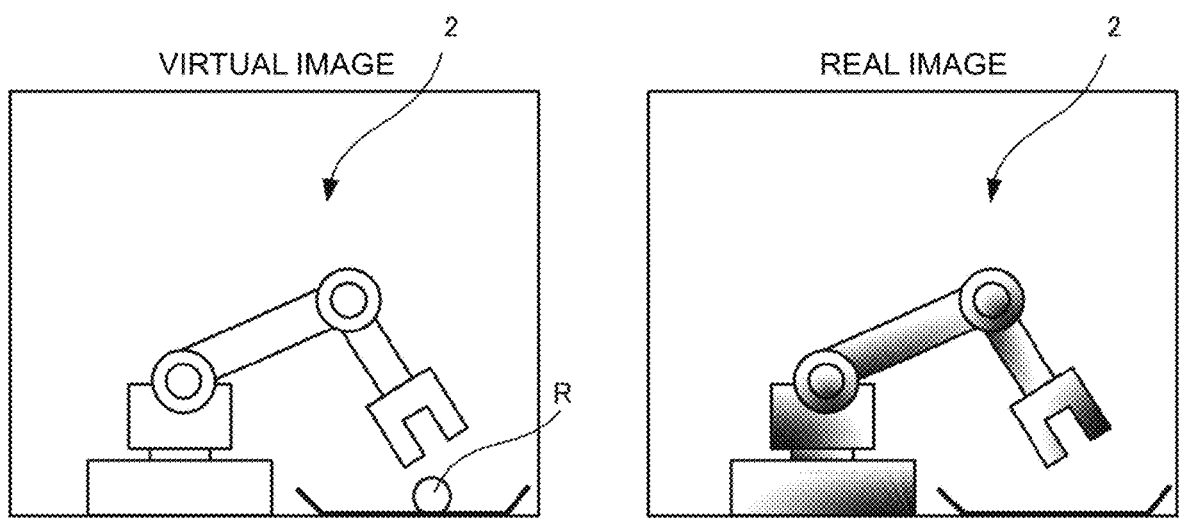
FIG. 9B is a diagram showing an example of correspondence between a virtual image and a real image.
Figure 9C:
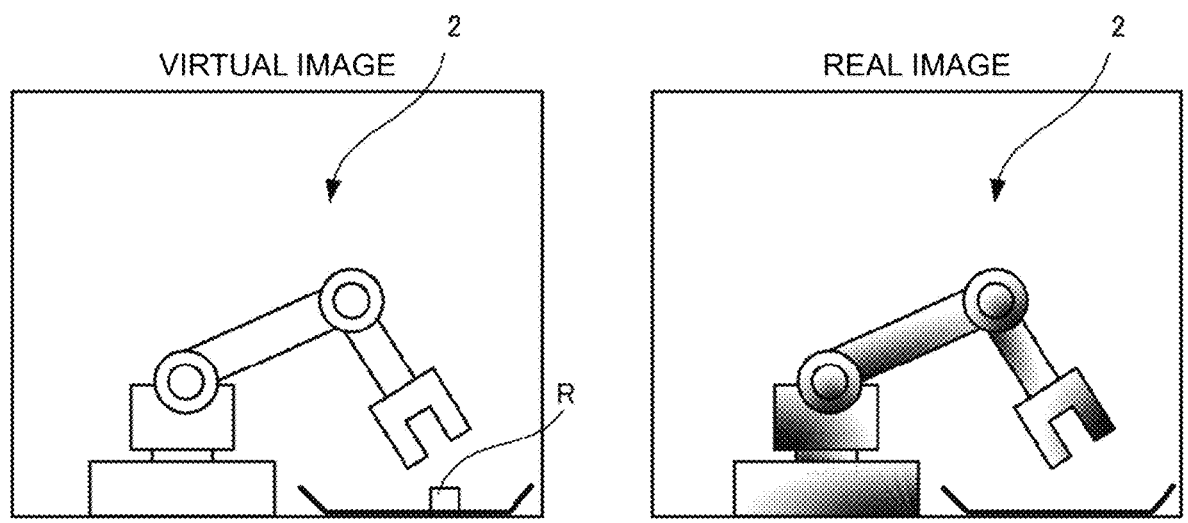
FIG. 9C is a diagram showing an example of correspondence between a virtual image and a real image.
Figure 10A:
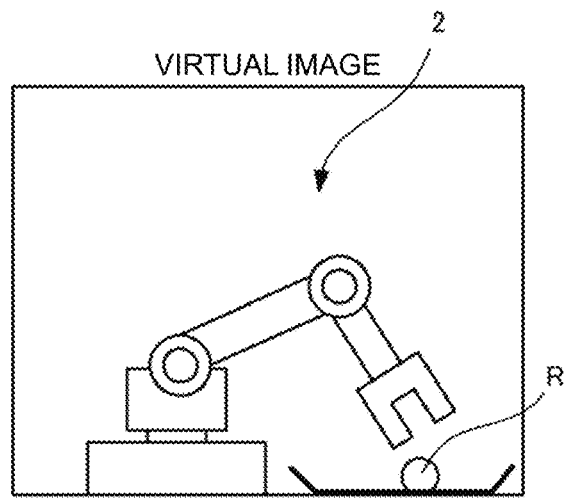
FIG. 10A is a diagram showing examples of a virtual image, a real image, and a composite image.
Figure 10A:
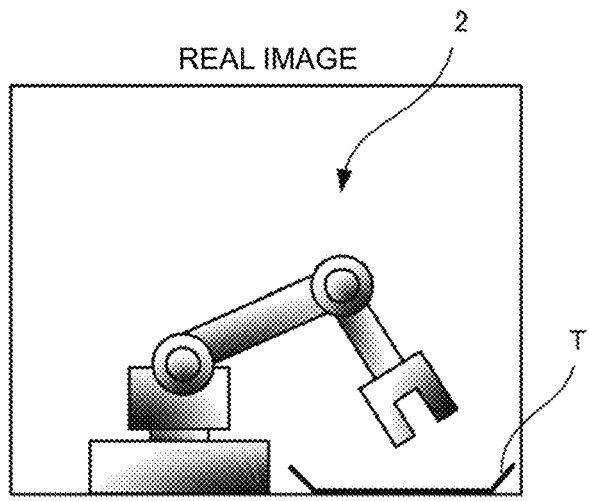
Figure 10A:
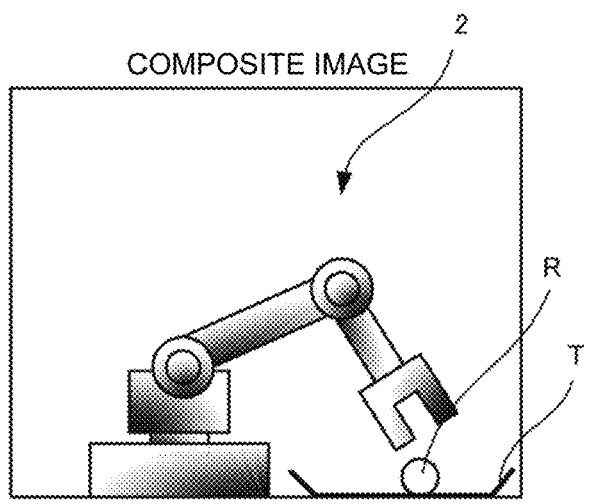
Figure 10B:
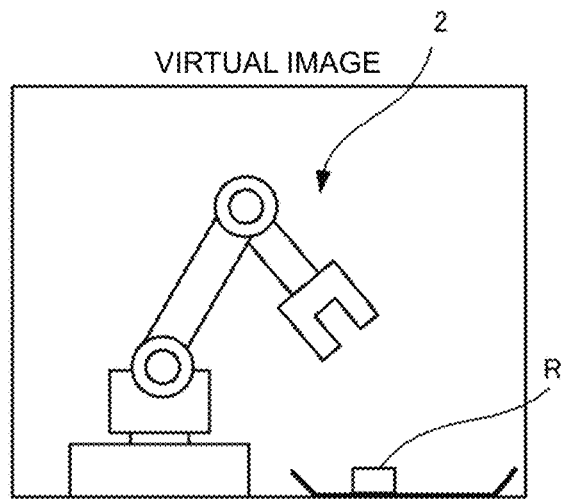
FIG. 10B is a diagram showing examples of a virtual image, a real image, and a composite image.
Figure 10B:
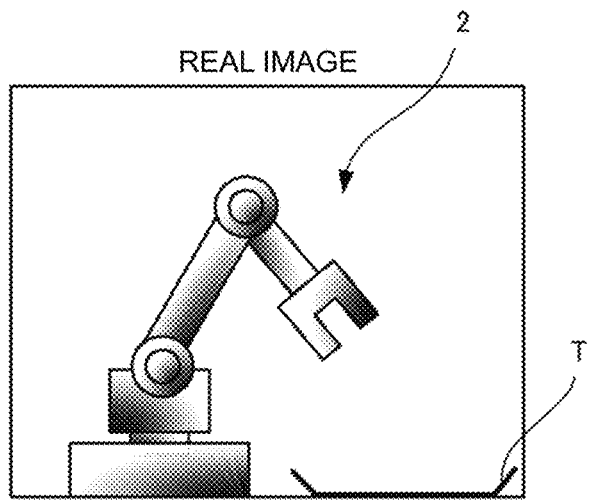
Figure 10B:
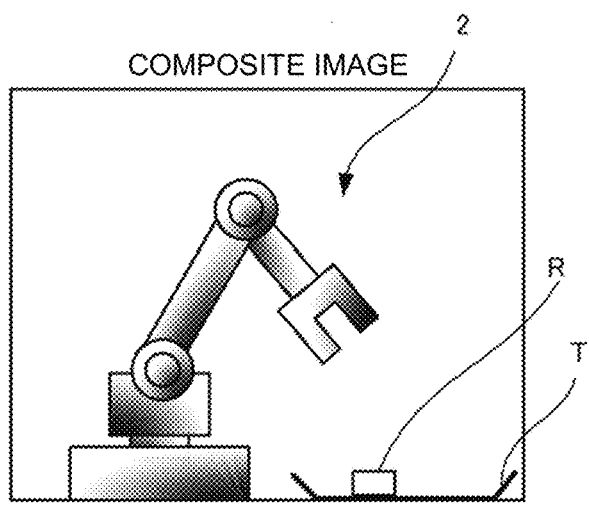

The processor 503 acquires real images of the operation space including the robot 2 captured by the camera 1. At this time, as the real images to be acquired, for example, as shown in FIGS. 9A to 9C, images corresponding to the virtual images are acquired. That is, real images of the operation space in which the robot 2 having the same arm rotation position and the same joint angle as those in each virtual image and a tray T containing the workpiece R is captured are acquired. For example, in the examples of FIGS. 9B and 9C, since only the workpieces included in the virtual images are different from each other, and the robots are in the same position, only one real image corresponding to this may be provided. Then, the processor 503 combines an image of the workpiece R with the acquired real image by using, for example, a known technique such as augmented reality (AR). In this case, the combined image of the workpiece R is generated by the extractor 502 on the basis of the information (position information or the like) extracted from the corresponding virtual image. In this way, in the processor 503, the composite image in which the image of the workpiece R is combined with the actual image is generated. Then, the virtual image generated by the virtual image generation unit 501 is transmitted to the generator 504, and the composite image generated by the processor 503 is transmitted to the discriminator 505. FIGS. 10A and 10B show examples of the virtual image, the real image, and the composite image.

Next, the generator 504 and the discriminator 505 will be described. The generator 504 and the discriminator 505 form a learning network through GAN. In addition, the generator 504 is configured of a neural network having a multi-layer structure similar to that of the control device 3 and the learning apparatus 4. Similarly, the discriminator 505 is also configured of a multi-layered neural network. However, a configuration of the discriminator 505 may be different from that of the generator 504.

Then, the learning processing unit 506 carries out machine learning of the learning network. Performing this machine learning involves alternating a first training step of training the discriminator 505 and a second training step of training the generator 504. In the first training step, the learning processing unit 506 trains the discriminator 505 to discriminate whether an image input to the discriminator 505 is an image (a learning image, which will be described later) generated by the generator 504 or a composite image transmitted from the processor 503. That is, the discriminator 505 is trained to discriminate whether the given image is originated from the processor 503 or the generator 504. Further, in the second training step, the learning processing unit 506 trains the generator 504 to generate an image that causes an erroneous discrimination performed by the discriminator 505. Also, here, what is originated from the processor 503 is expressed as "true," and what is originated from the generator 504 is expressed as "false." However, a method for expressing each origin is not limited to such an example and may be appropriately selected depending on embodiments.

Specifically, in the first training step, the learning processing unit 506 inputs a virtual image to an input layer of the generator 504 and executes arithmetic processing of the generator 504. Thus, the generator 504 acquires a learning image that approximates a composite image corresponding to the input virtual image from an output layer thereof. For example, the virtual image is converted from the virtual image shown in FIG. 10A to approximate the composite image, and the learning image is output.

Then, the learning processing unit 506 inputs the learning image to an input layer of the discriminator 505, and arithmetic processing of the discriminator 505 is executed. Thus, an output value corresponding to the result of discriminating whether the learning image is originated from the generator 50 or the processor 503 is acquired from an output layer thereof. Here, since the image input to the discriminator 505 is a learning image generated by the generator 504, the correct answer is that the discriminator 505 discriminates it as "false." Then, an error between the output value obtained from the output layer and the correct answer is calculated. The learning processing unit 506 calculates the error between the output value obtained from the output layer and the correct answer for each learning image.

Similarly, the learning processing unit 506 inputs the composite image to the input layer of the discriminator 505 and executes arithmetic processing of the discriminator 505. Thus, the learning processing unit 506 acquires an output value corresponding to the result of discriminating whether the input image is originated from the generator 504 or the processor 503 from the output layer. Here, since the input image is the composite image, the correct answer is that the discriminator 505 discriminates it as "true." The learning processing unit 506 calculates an error between the output value obtained from the output layer and the correct answer for each composite image.

Then, the learning processing unit 506 adjusts parameter values of the discriminator 505 so that a sum of the calculated errors becomes small. The learning processing unit 506 repeats the adjustment of the parameter values of the discriminator 505 through a series of the above processing until the sum of the errors between the output value obtained from the output layer and the correct answer of true or false becomes equal to or less than a threshold. Thus, in the first training step, the learning processing unit 506 trains the discriminator 505 to discriminate whether the image is the learning image generated by the generator 505 or the composite image.

On the other hand, in the second training step, the learning processing unit 506 inputs the virtual image to the input layer of the generator 504 and executes arithmetic processing of the generator 504. Thus, as described above, the learning processing unit 506 acquires the learning image that approximates the composite image corresponding to the input virtual image from the output layer. That is, the learning image obtained by converting the virtual image into an image similar to the composite image including the real image is output.

Next, the learning processing unit 506 inputs the generated learning image to the input layer of the discriminator 505 and executes arithmetic processing of the discriminator 505. Thus, the learning processing unit 506 acquires an output value corresponding to the result of discriminating whether the input learning image is originated from the generator 504 or the processor 503 from the output layer. In the training of the generator 504, the correct answer is to cause the result of discrimination performed by the discriminator 505 to be incorrect. That is, it is sufficient that the learning image generated by the generator 504 is generated such that it closely approximates the composite image to be mistaken for the composite image, and the correct answer is that the output value obtained from the output layer corresponds to "true." The learning processing unit 506 calculates an error between the output value obtained from the output layer through a series of processing and the correct answer (that is, "true") for each combination of the learning image and the composite image.

Then, the learning processing unit 506 adjusts parameter values of the generator 504 so that a sum of the calculated errors becomes smaller. For each combination of the learning image and the composite image, the learning processing unit 506 repeats the adjustment of the parameter values of the generator 504 through a series of the above processing until the sum of the errors between the output value obtained from the output layer through the series of processing and the "true" becomes equal to or less than the threshold. As a result, in the second training step, the learning processing unit 506 trains the generator 504 to generate the learning image that causes the erroneous discrimination performed by the discriminator 505.

In this way, the learning processing unit 506 alternately increases accuracy of the discriminator 505 and accuracy of the generator 504 by alternately performing the first training step and the second training step. As a result, the generator 504 can acquire the ability to appropriately generate the learning image that is substantially the same as the composite image including the real image.

After the machine learning is completed, the storage processing unit 507 generates the first learning result data and the second learning result data indicating configurations of the constructed generator 504 and the discriminator 505 (for example, the number of layers of the neural network, the number of neurons in each layer, connectional relationships between neurons, and a transfer function of each neuron) and arithmetic parameters (for example, a weight of combination between respective neurons, and a threshold of each neuron). Then, the storage processing unit 507 stores the generated first and second learning result data in a predetermined storage region.

In this way, when the virtual image generated by the virtual image generator 501 is input to the learned generator 504, the learning image that approximates the composite image can be generated. As described above, in generating the learning image, it is not necessary to prepare the real image including the real workpiece R, and a load of generating the learning image can be reduced. That is, the learning image can be easily generated. Then, the learning image is transmitted to the learning apparatus 4, but before that, the predictor 508 is prepared in order to determine whether or not the learning image is appropriate. This predictor 508 is configured of a multi-layered neural network and is learned to input the learning image generated by the learned generator 504 and output whether or not the learning image is appropriate for controlling the gripping device 2. For the learning data, the evaluation output by the evaluation device, which will be described below, can be used. That is, when the gripping operation can be performed properly as a result of simulating the robot 2 on the basis of the learning result data learned using the generated learning image, it can be determined that the learning image is appropriate. On the other hand, in a case in which the gripping operation is not appropriate, it can be determined that the learning image is not appropriate. Therefore, when the predictor 508 is learned using a combination of the learning image and the evaluation performed by the evaluation device 6 as the learning data, it is possible to determine suitability of the learning image generated by the predictor 508 before the simulation is performed. The learning result data of the predictor 508 generated at this time becomes the third learning result data.

<2-2-2. Control Device>

Figure 11:
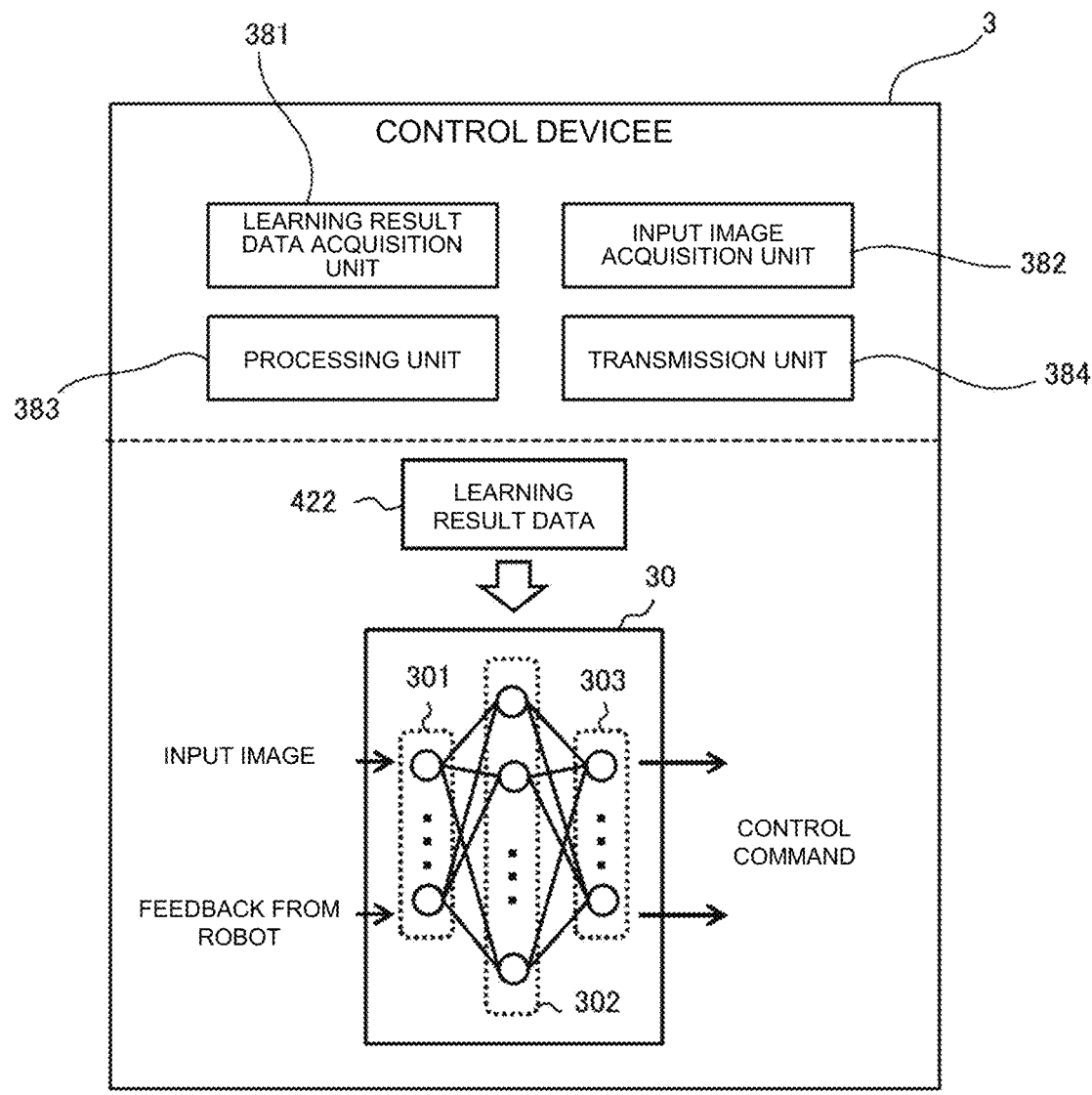
FIG. 11 is a functional block diagram of the control device of FIG. 3.

Next, a software configuration of the control device 3 will be described with reference to FIG. 11. As shown in FIG. 11, the control unit 31 of the control device 3 functions as a computer which interprets and executes the control program 321 stored in the storage unit 32 using the CPU when the control program 321 is developed into the RAM and includes a learning result data acquisition unit 381, an input image acquisition unit 382, a processing unit 383, and a transmission unit 384.

The learning result data acquisition unit 381 acquires the learning result data 422 from the learning apparatus 4. Further, the input image acquisition unit 382 acquires the input image transmitted from the camera 1. In addition, the processing unit 383 constitutes the learner that is learned to output a control command for the operation of the robot 2 on the basis of the input image when the input image is input.

The processing unit 383 that performs such output is configured of a neural network 30. Specifically, the processing unit 383 is a so-called multi-layered neural network 30 used for deep learning as shown in FIG. 11 and includes an input layer 301, an intermediate layer (a hidden layer) 302, and an output layer 303 in order from the input.

In the example of FIG. 11, the neural network 30 includes one layer of the intermediate layer 302, in which an output of the input layer 301 is an input of the intermediate layer 302, and an output of the intermediate layer 302 is an input of the output layer 303. However, the number of the intermediate layer 302 is not limited to one, and the neural network 30 may include two or more intermediate layers 302.

Each layer 301 to 303 includes one or more neurons. For example, the number of neurons in the input layer 301 can be set in accordance with the number of input images. The number of neurons in the intermediate layer 302 can be appropriately set depending on embodiments. Further, the output layer 303 can also be set in accordance with the number of control commands.

Neurons in adjacent layers are appropriately connected to each other, and a weight (a load of connection) is set for each connection. In the example of FIG. 7, each neuron is connected to all neurons in adjacent layers, but the connection of neurons does not have to be limited to such an example and may be appropriately set according to embodiments.

A threshold is set for each neuron, and basically, an output of each neuron is determined by whether or not a sum of products of each input and each weight exceeds the threshold. By inputting the input image into the input layer 301 of the neural network 30, the control device 3 obtains a control command indicating the optimum operation of the robot from the output layer 73.

In addition, information indicating the configuration of such a neural network 30 (for example, the number of layers of the neural network, the number of neurons in each layer, a connectional relationship between neurons, and a transfer function of each neuron), the weight of the connection between respective neurons, and the threshold of each neuron is included in the learning result data 422 generated by the learning apparatus 4. Therefore, the learning result data acquisition unit 381 performs setting of the learned neural network 30, that is, the processing unit 383, with reference to the learning result data 422 transmitted from the learning apparatus 4.

Then, the control command output by the processing unit 383 is transmitted to the robot 2 by the transmission unit 384.

<2-2-3. Learning Apparatus>

Figure 12:
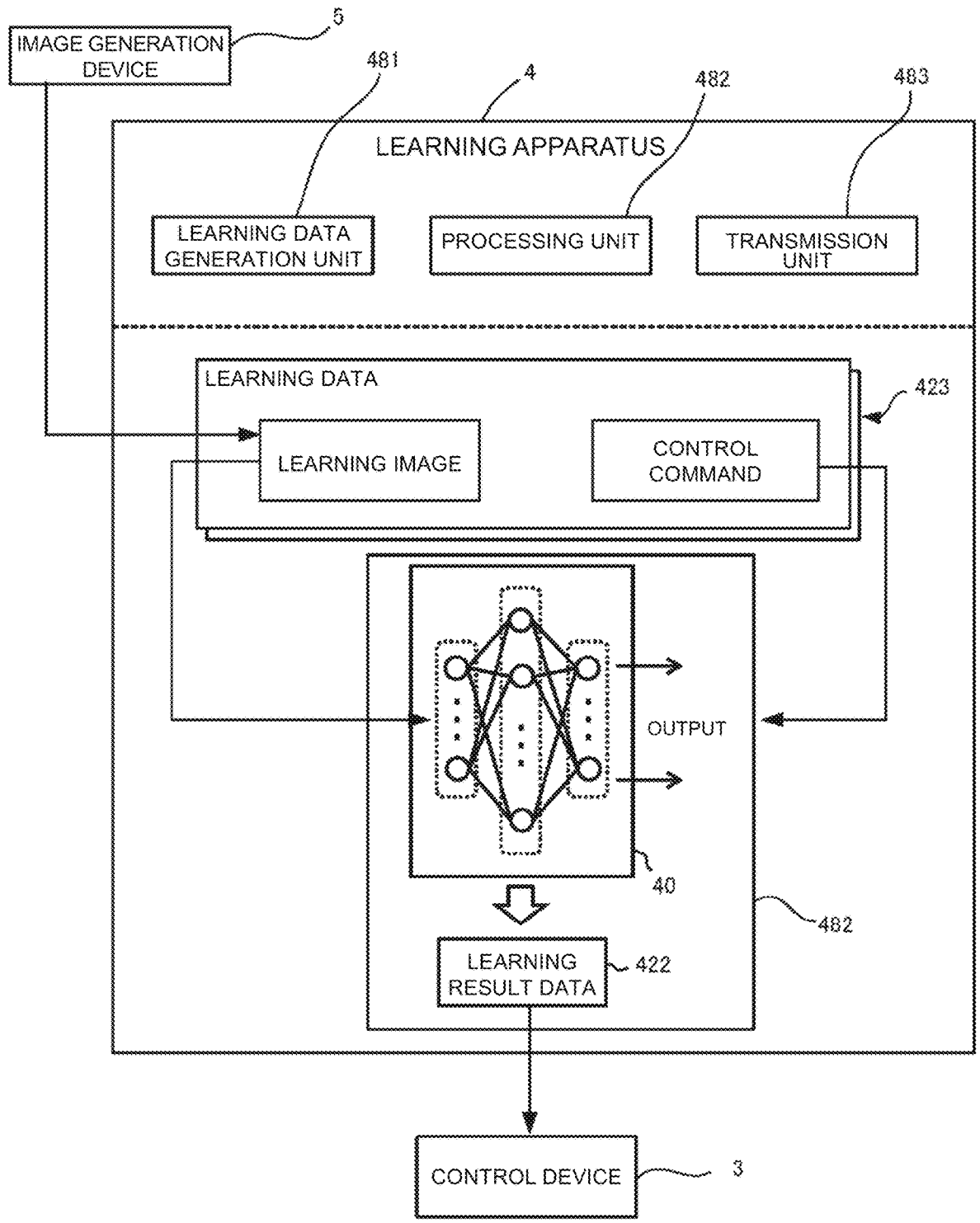
FIG. 12 is a functional block diagram of the learning apparatus of FIG. 4.

Next, a software configuration of the learning apparatus 4 will be described with reference to FIG. 12. As shown in FIG. 12, the control unit 41 of the learning apparatus 4 functions as a computer that interprets and executes the learning program 421 stored in the storage unit 42 using the CPU when the learning program 421 stored in the storage unit 42 is developed into the RAM and includes a learning data generation unit 481, a processing unit 482, and a transmission unit 483.

The learning data generation unit 481 collects the learning image received from the image generation device 5 and the control command for performing an appropriate gripping operation from the positional relationship between the robot 2 and the workpiece R shown in the learning image and generates the learning data 423 from these. In addition, the processing unit 482 has a neural network 40 as the learner and learns the neural network 40 by an error propagation method or the like using the learning data 423. Then, the learning result data 422 obtained as a result of this learning is transmitted to the control device 3 by the transmission unit 483.

<2-2-4. Evaluation Device>

Figure 13:
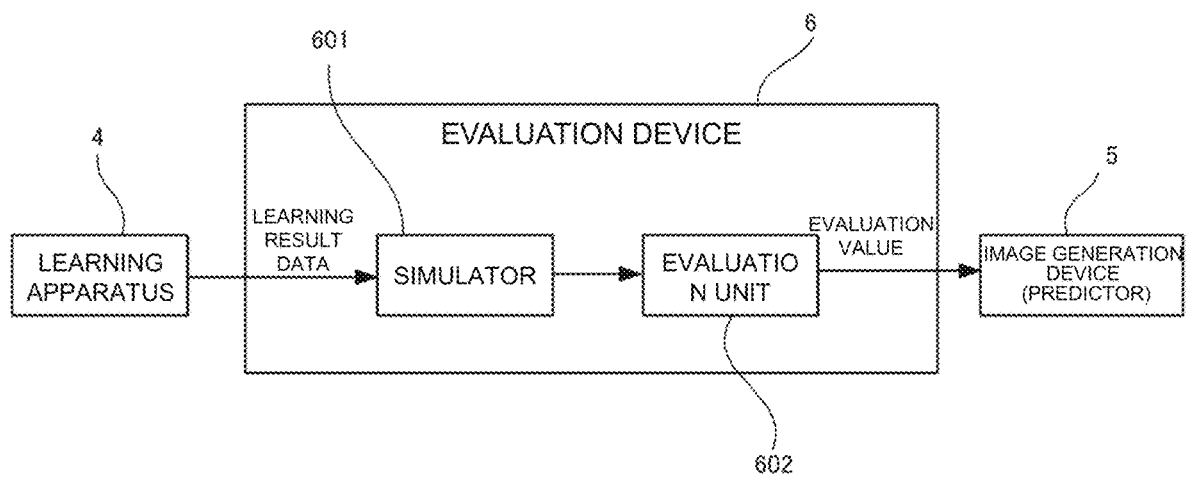
FIG. 13 is a functional block diagram of an evaluation device of FIG. 6.

Next, a software configuration of the evaluation device 6 will be described with reference to FIG. 13. As shown in FIG. 13, the control unit 61 of the evaluation device 6 functions as a computer which interprets and executes the simulation program 621 stored in the storage unit 62 using the CPU when the simulation program 621 is developed into the RAM and includes a simulator 601 and an evaluation unit 602.

The simulator 601 performs simulation of the gripping device 2 on the basis of the learning result data 422 received from the learning apparatus 4. Therefore, the simulator 601 reproduces the control device 3 into which the learning result data 422 is incorporated and the robot 2 on a computer and simulates whether or not the robot 2 performs an appropriate gripping operation when a prescribed input image is input. Then, the evaluation unit 602 evaluates the operation. That is, as described above, the evaluation unit 602 evaluates, as a result of the simulation, whether or not the robot 2 can grip the workpiece R, can grip the workpiece R at a correct angle, can grip a correct position of the workpiece R, and can convey and then correctly dispose the workpiece R. In addition, if the evaluation is equal to or higher than a predetermined value, the learning result data used in this simulation can be determined to be appropriate and is used by the control device 3.

Further, the learning image used for generating the learning result data used for the evaluation is used for learning the predictor 508 of the image generation device 5 described above.

3. Operation Example

Figure 14:
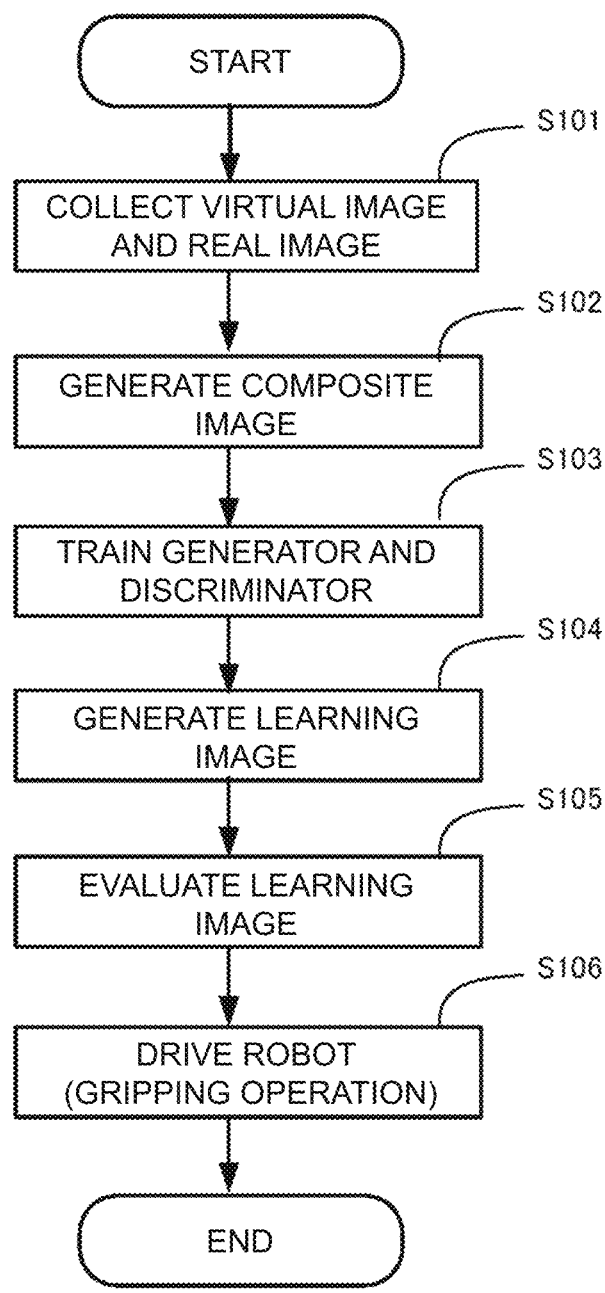
FIG. 14 is a flowchart showing an operation example of the system of FIG. 2.

Next, an operation example of the gripping system configured as described above will be described with reference to the flowchart of FIG. 14. First, data such as images is collected (step S101). That is, a plurality of real images is acquired by the camera 1, and a plurality of virtual images is acquired by the virtual image generator 501. Next, composite images are generated from the acquired images. That is, features related to the robot 2 and the workpiece R are extracted from the virtual images, and the composite images in which the workpiece is combined with the corresponding real image is generated on the basis of the features (step S102). Subsequently, the generator 504 and the discriminator 505 are trained on the basis of the virtual images and the composite images (step S103). When the training of the generator 504 is completed in this way, learning image are generated from the virtual images using the learned generator 504 (step S104).

The generated learning image is transmitted to the learning apparatus 4, and the learning apparatus 4 generates learning result data for driving the control device 3. Then, the evaluation device 6 evaluates whether or not the generated learning result data is appropriate (step S105) and if appropriate, the learning result data is mounted on the control device 3, and the camera 1 and the robot 2 are used to actually grip the workpiece (step S106).

4. Features

As described above, according to the present embodiment, the image generation device 5 generates the learning image for learning the control device 3 of the robot 2. If an image close to the real image is not used as such an image for learning, the robot 2 may not operate well. However, it is not easy to prepare a large number of learning images in which positions and orientations of the robot 2 and the workpiece R have changed. Therefore, in the present embodiment, the real image of the real operation space including only the robot 2 and the tray T is acquired, and the composite image obtained by combining the virtual image of the workpiece R is generated. In addition, by using GAN, the virtual image is converted into a learning image that is made to approximate the composite image, which is adopted as the learning image. Therefore, in generating the learning image, it is not necessary to prepare a real image including the real workpiece R, and the load of generating the learning image can be reduced. That is, the learning image can be easily generated. Further, since the real operation space including the robot R included in the generated learning image is generated to approximate the real image, it is possible to prevent an erroneous positional relationship between the robot 2 and the workpiece R from being identified from this image, and highly accurate learning becomes possible.

5. Modified Examples

Although the embodiment of the present invention has been described in detail above, the above description is merely an example of the present invention in all respects. It is needless to say that various improvements and modifications can be made without departing from the scope of the present invention. For example, the following changes can be made. Also, in the following, the same reference numerals will be used for the same components as those in the above embodiment, and the same points as in the above embodiment will be omitted as appropriate. The following modified examples can be appropriately combined.

<5-1>

In the above embodiment, a so-called multi-layered fully connected neural network is used for the processing unit 383, the processing unit 482, the generator 504, the Discriminator unit 505, and the predictor 508. However, a structure and a type of the neural network constituting these are not limited to such an example and may be appropriately selected according to embodiments. For example, a convolutional neural network may be used for at least one of these.

<5-2>

In the above embodiment, although the virtual image generator 501 is provided in the image generation device 5, the above processing can be performed after the virtual image is generated by another device and acquired by the image generation device 5. In the above embodiment, the real operation space including the robot 2 and the tray T is shown in the real image, but at least the robot 2 may be shown.

<5-3>

In the above embodiment, the image generation device 5 is provided with the predictor 508, but the predictor 508 is not always necessary and may not be provided.

<5-4>

In the above embodiment, the learning image is generated from the virtual image and the composite image using GAN, but the learning image that is made to approximate an image including a real image can be generated using a method other than GAN on the basis of a virtual image.

<5-5>

In the above embodiment, the image generation device 5 generates the learning image for controlling the robot 2 to grip the workpiece. However, the generation of such a learning image is not limited to the case of gripping the workpiece and can be applied to the entire visual servo system in which the robot performs some operation on the workpiece. That is, the image generation device of the present invention can be applied to an overall system in which control of pushing, moving, processing, or the like of a workpiece is performed on the basis of images.

What is claimed is:

1. An image generation device configured to generate a learning image for training an action of a robot which carries out a prescribed operation on a workpiece on the basis of an input image, comprising:
    a hardware storage, storing a first image acquisition unit, a second image acquisition unit and a learner; and
    a hardware processor, coupled to the hardware storage and configured to:
    execute the first image acquisition unit to acquire a real image of a real operation space including the robot and not including the workpiece, wherein the real image includes an imaging of the robot and does not include an imaging of the workpiece; and
    execute the second image acquisition unit to acquire a virtual image in which a virtual operation space including a virtual robot corresponding to the robot and a virtual workpiece corresponding to the workpiece is rendered;
    wherein the learner is trained by machine learning, and the learner includes: a generator and a fourth image acquisition unit,
    the hardware processor is configured to:
    execute the fourth image acquisition unit to obtain the virtual workpiece based on the virtual image and generate a composite image by adding the virtual workpiece to the real image; and
    execute the generator to generate the learning image by using the virtual image and the composite image, wherein the learning image is obtained by converting the virtual image such that at least the virtual robot included in the virtual image is made to approximate the robot included in the composite image is output.

2. The image generation device according to claim 1, wherein the learner further includes: a discriminator connected to the generator and the fourth image acquisition unit, the hardware processor is configured to:
    execute the generator to generate the learning image; and
    wherein the machine learning includes alternating performing a first training step of training the discriminator and a second training step of training the generator,
    the first training step is used to train the discriminator to discriminate whether an image input to the discriminator is the learning image generated by the generator or the composite image transmitted from the fourth image acquisition unit,
    the second training step is used to train to generate the learning image that causes an erroneous discrimination performed by the discriminator.

3. The image generation device according to claim 2, wherein the learner further includes a predictor trained by the hardware processor such that the learning image is input and performance of the operation performed by the robot is output.

4. A robot training system comprising:
    an imaging unit which acquires the input image:
    the robot; and
    the image generation device according to claim 1,
    wherein the robot is trained to perform a prescribed processing operation from the input image in accordance with learning data including the learning image generated by the image generation device.

5. The robot training system according to claim 4, further comprising a simulator which simulates the operation of the robot and an evaluation unit which evaluates an operation performed by the simulator.

6. An image generation method is an image generation method that generates a learning image for training an action of a robot which carries out a prescribed operation on a workpiece on the basis of an input image, comprising the steps of:
    acquiring a real image of a real operation space including the robot and not including the workpiece, wherein the real image includes an imaging of the robot and does not include an imaging of the workpiece;
    acquiring a virtual image in which a virtual operation space including a virtual robot corresponding to the robot and a virtual workpiece corresponding to the workpiece is rendered; and
    using a learner trained by machine learning to obtain the virtual workpiece based on the virtual image and generate a composite image by adding the virtual workpiece to the real image; and generate the learning image by using the virtual image and the composite image, wherein the learning image is obtained by converting the virtual image such that at least the virtual robot included in the virtual image is made to approximate the robot included in the composite image.

7. A non-transitory computer readable storage medium storing image generation program causing a computer that generates a learning image for training an action of a robot which carries out a prescribed operation on a workpiece on the basis of an input image to execute the steps of:
    acquiring a real image of a real operation space including the robot and not including the workpiece, wherein the real image includes an imaging of the robot and does not include an imaging of the workpiece;
    acquiring a virtual image in which a virtual operation space including a virtual robot corresponding to the robot and a virtual workpiece corresponding to the workpiece is rendered; and
    using a learner trained by machine learning to obtain the virtual workpiece based on the virtual image and generate a composite image by adding the virtual workpiece to the real image; and generate the learning image by using the virtual image and the composite image, wherein the learning image is obtained by converting the virtual image such that at least the virtual robot included in the virtual image is made to approximate the robot included in the composite image.

8. A robot training system comprising:
    an imaging unit which acquires the input image:
    the robot; and
    the image generation device according to claim 2,
    wherein the robot is trained to perform a prescribed processing operation from the input image in accordance with learning data including the learning image generated by the image generation device.

9. A robot training system comprising:
    an imaging unit which acquires the input image:
    the robot; and
    the image generation device according to claim 3,
    wherein the robot is trained to perform a prescribed processing operation from the input image in accordance with learning data including the learning image generated by the image generation device.

\* \* \* \* \*